(12) United States Patent
Selvaraj et al.

(10) Patent No.: US 8,719,096 B2
(45) Date of Patent: May 6, 2014

(54) SYSTEM AND METHOD FOR GENERATING A MAXIMUM UTILITY SLATE OF ADVERTISEMENTS FOR ONLINE ADVERTISEMENT AUCTIONS

(75) Inventors: Sathiya Keerthi Selvaraj, Cupertino, CA (US); John Anthony Tomlin, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1822 days.

(21) Appl. No.: 11/642,433

(22) Filed: Dec. 20, 2006

(65) Prior Publication Data

US 2008/0154662 A1 Jun. 26, 2008

(51) Int. Cl.
*G06Q 30/00* (2012.01)
*G06Q 40/00* (2012.01)

(52) U.S. Cl.
USPC .................... 705/14.63; 705/37; 705/26.3

(58) Field of Classification Search
USPC ............ 705/14, 7, 14.73, 37, 26.3; 707/1–10
See application file for complete search history.

(56) References Cited

U.S. PATENT DOCUMENTS

| | | | |
|---|---|---|---|
| 2003/0033236 A1* | 2/2003 | Davenport et al. | 705/37 |
| 2004/0024686 A1* | 2/2004 | Sandholm et al. | 705/37 |
| 2004/0167816 A1* | 8/2004 | Kamath | 705/14 |
| 2006/0253319 A1* | 11/2006 | Chayes et al. | 705/14 |

* cited by examiner

*Primary Examiner* — Sun Li
(74) *Attorney, Agent, or Firm* — Buchenhorner Patent Law (57) ABSTRACT

An improved system and method for generating a maximum utility slate of advertisements for online advertisement auctions is provided. Various utility factors for each advertisement that may be a candidate in a slate of advertisements may be applied within a framework in order to generate a maximum utility slate of advertisements. Either backward or forward dynamic programming may be applied to recursively evaluate the utility of subslates of advertisements in order to generate a maximum utility slate of advertisements. In an embodiment, a network with directed edges and associated costs may be defined, and the longest path may be found in the directed network for constructing a maximum utility slate of advertisements. Various utility factors may be applied for different objectives of an auctioneer and the framework presented may be extended for revenue ordering, exclusion of bidders, ordering slates according to first and second price utilities, and so forth.

14 Claims, 7 Drawing Sheets

SYSTEM AND METHOD FOR GENERATING A MAXIMUM UTILITY SLATE OF ADVERTISEMENTS FOR ONLINE ADVERTISEMENT AUCTIONS

FIELD OF THE INVENTION

The invention relates generally to computer systems, and more particularly to an improved system and method for generating a list of advertisements for online advertisement auctions.

BACKGROUND OF THE INVENTION

Modern search advertising systems monetize search by showing a set of sponsored links, representing advertisements, deemed relevant to the search term and ordered using simple greedy algorithms to capture as much revenue as possible. Typically, the display of such sponsored search ads may be governed by an auction mechanism whereby advertisers may bid on particular terms for a limited number of ad positions which can be shown with the algorithmic results for the search on a keyword or query. A default candidate set of advertisements ordered according to the rules of the auction mechanism may be selected by choosing the top number of advertisements for the limited number of ad positions.

However, selection of such a default candidate set of advertisements in an implementation of an online keyword auctions system may be at the expense of negatively impacting an optimal auctioneer's objective. For instance, an implementation may choose the highest bidders so that each buyer may continue to participate in each auction as long as a buyer's budget may not be exceeded. Such an implementation may fail to provide the optimal objective for an auctioneer. At some point in the day, a buyer that may be able to bid on a variety of keyword auctions may actually spend the entire daily budget as the highest bidder on frequently occurring keywords, and thereby be removed as an available buyer for bidding on less frequently occurring keywords. Thus, this greedy approach may also result in removing more buyers from auctions as the day progresses than may be necessary considering pricing and frequency of keywords over the course of a day.

What is needed is a system and method that may provide a framework that may be used to optimize various objectives of an online auctioneer. Such a system and method should be able to support an auctioneer's objective to maximize revenue, to exclude bidders under certain conditions, and/or to maximize overall utility value of the auctioned keywords to the bidders.

SUMMARY OF THE INVENTION

Briefly, the present invention may provide a system and method for generating a maximum utility slate of advertisements for online advertisement auctions. In various embodiments, a client having a web browser may be operably coupled to a server for sending a query request. The server may include a dynamic programming analysis engine for using dynamic programming to recursively evaluate the utility of subslates of advertisements for a keyword of a query request in order to generate a maximum utility slate of advertisements for online advertising auctions. The dynamic programming analysis engine may include an operably coupled backward analysis engine for performing dynamic programming using a backward recursive evaluation of the utility of subslates of advertisements. The dynamic programming analysis engine may also include an operably coupled forward analysis engine for performing dynamic programming using a forward recursive evaluation of the utility of subslates of advertisements. Each of the advertisement slates may represent an ordered candidate set of advertisements for keywords of a query request. The server may then choose a maximum utility slate of advertisements to accompany search results of a query request to the web browser.

The present invention may provide a framework for applying various utility factors for each advertisement that may be a candidate for a slate of advertisements in order to generate a maximum utility slate of advertisements. To do so, bids of bidders may be obtained for a keyword in an embodiment; the estimated click-through-rate may be determined for ad positions on a web page for the keyword; a utility factor may be obtained for each advertisement that may be a candidate for a slate of advertisements; and dynamic programming may be applied to recursively evaluate the utility of subslates of advertisements for the keyword in order to generate a maximum utility slate of advertisements for the keyword. Each subslate of advertisements may represent an ordered candidate set of advertisements, where the ordering may be determined by applying utility factors for advertisements in each subslate. The maximum utility slate may be chosen and served for display with query results. For instance, the maximum utility slate of advertisements may be sent to a web browser in an embodiment for display as an ordered set of sponsored.

In an embodiment, backward dynamic programming may be applied to recursively compute the utility value associated with each advertisement and advertisement position in subslates of advertisements in order to generate a maximum utility slate of advertisements. In various other embodiments, forward dynamic programming may be applied to recursively compute the utility value associated with each advertisement and advertisement position in subslates of advertisements in order to generate a maximum utility slate of advertisements. For instance, a network with directed edges and associated costs may be defined in an embodiment, and the longest path may be found from a node of origin to a terminal node of the directed network for constructing a maximum utility slate of advertisements.

Advantageously, the framework of the present invention may flexibly be extended to provide revenue ordering, to exclude either budgeted or unbudgeted bidders from a slate of advertisements, to order slates according to first and second price utilities, and so forth. Any number of various utility factors may be applied using the framework of the present invention for different objectives of an auctioneer, including utility factors for maximizing expected revenue, reducing ad fatigue induced by overexposure of the ad, scheduling bids within bidders' budget constraints, and so forth.

Other advantages will become apparent from the following detailed description when taken in conjunction with the drawings, in which:

DETAILED DESCRIPTION

Exemplary Operating Environment

Figure 1:
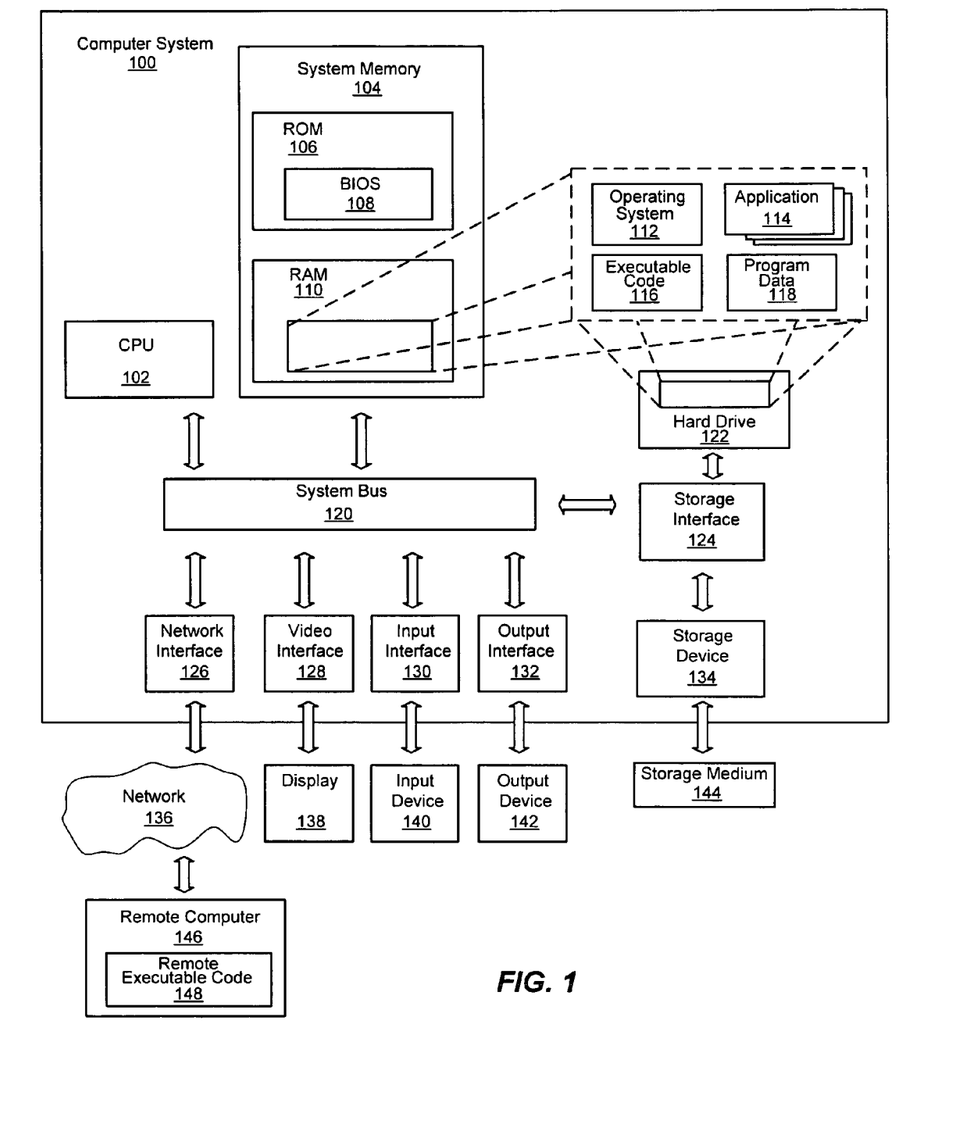
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Generating a Maximum Utility Slate of Advertisements for Online Advertisement Auctions The present invention is generally directed towards a system and method for generating a maximum utility slate of advertisements for online advertisement auctions. Various utility factors for each advertisement that may be a candidate in a slate of advertisements may be applied within a framework in order to generate a maximum utility slate of advertisements. Either backward or forward dynamic programming may be applied to recursively evaluate the utility of subslates of advertisements in order to generate a maximum utility slate of advertisements. For instance, a network with directed edges and associated costs may be defined in an embodiment, and the longest path may be found in the directed network for constructing a maximum utility slate of advertisements.

As will be seen, various utility factors may be applied for different objectives of an auctioneer and the framework presented may be extended for revenue ordering, exclusion of bidders, ordering slates according to first and second price utilities, and so forth. As will be understood, the various block diagrams, flow charts and scenarios described herein are only examples, and there are many other scenarios to which the present invention will apply.

Figure 2:
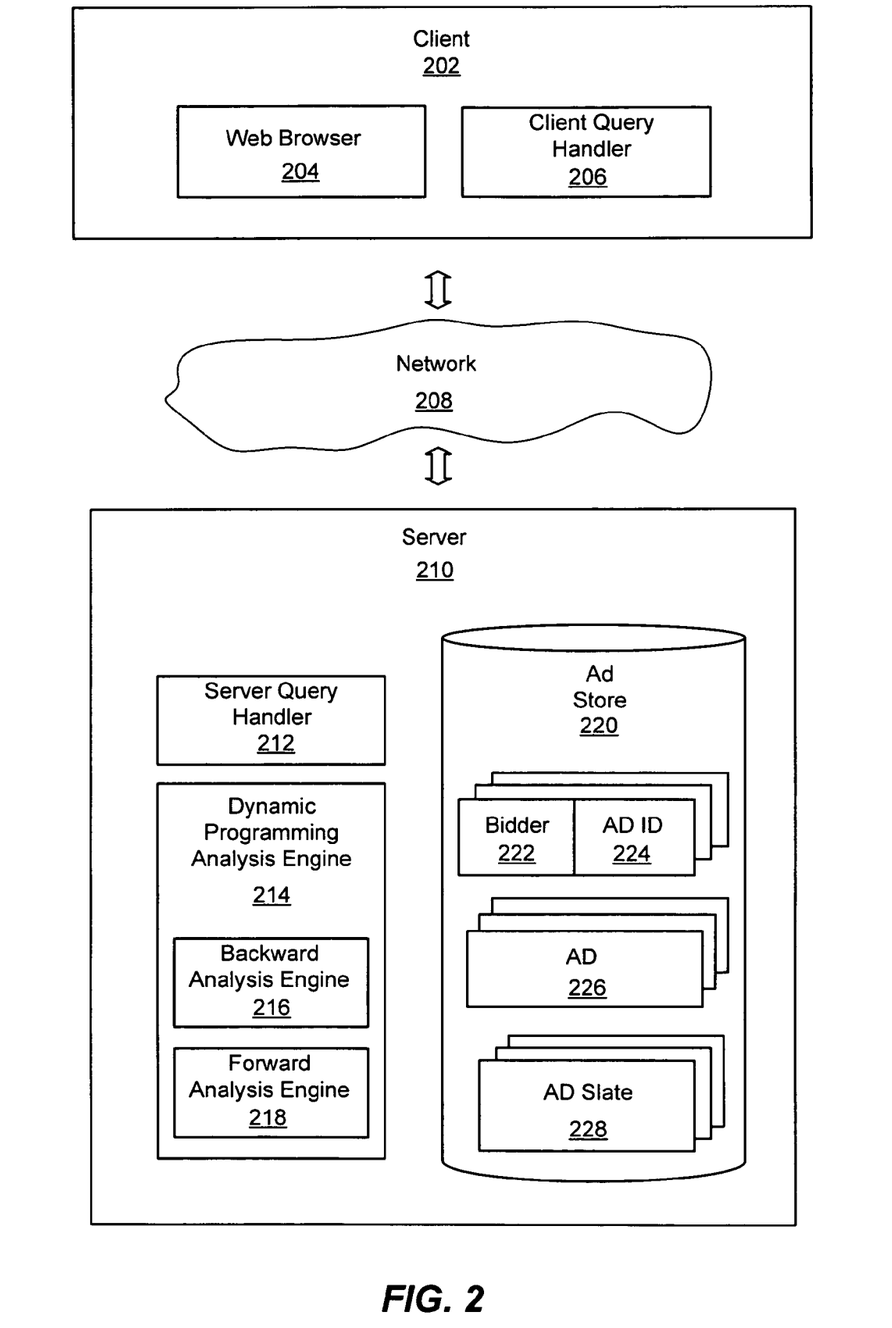
FIG. 2 is a block diagram generally representing an exemplary architecture of system components for generating a maximum utility slate of advertisements for online advertisement auctions, in accordance with an aspect of the present invention.

Turning to FIG. 2 of the drawings, there is shown a block diagram generally representing an exemplary architecture of system components for generating a maximum utility slate of advertisements for online advertisement auctions. Those skilled in the art will appreciate that the functionality implemented within the blocks illustrated in the diagram may be implemented as separate components or the functionality of several or all of the blocks may be implemented within a single component. For example, the functionality for the client query handler 206 may be included in the same component as the web browser 204. Or the functionality of the backward analysis engine 216 may be implemented as a separate component from the dynamic programming analysis engine 214. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 210 by a network 208. The client computer 202 may be a computer such as computer system 100 of FIG. 1. The network 208 may be any type of network such as a local area network (LAN), a wide area network (WAN), or other type of network. A web browser 204 may execute on the client computer 202 and may include functionality for receiving a search request which may be input by a user entering a query. The web browser 204 may be operably coupled to a client query handler 206 that may include functionality for receiving a query entered by a user and for sending a query request to a server to obtain a list of search results. In general, the web browser 204 and the client query handler 206 may be any type of interpreted or executable software code such as a kernel component, an application program, a script, a linked library, an object with methods, and so forth.

The server 210 may be any type of computer system or computing device such as computer system 100 of FIG. 1. In general, the server 210 may provide services for query processing and may include services for providing a list of auctioned advertisements to accompany the search results of query processing. In particular, the server 210 may include a server query handler 212 for receiving and responding to query requests and a dynamic programming analysis engine 214 for using dynamic programming to recursively evaluate the utility of subslates of advertisements for a keyword of a query request in order to generate a maximum utility slate of advertisements for online advertising auctions. The dynamic programming analysis engine 214 may include an operably coupled backward analysis engine 216 for performing dynamic programming using a backward recursive evaluation of the utility of subslates of advertisements. The dynamic programming analysis engine 214 may also include an operably coupled forward analysis engine 218 for performing dynamic programming using a forward recursive evaluation of the utility of subslates of advertisements. Each of these modules may also be any type of executable software code such as a kernel component, an application program, a linked library, an object with methods, or other type of executable software code.

The server 210 may be operably coupled to a database of advertisements such as ad store 220 that may include any type of advertisements 226 that may be associated with an ad ID 224. In an embodiment, several bidders 222 may be associated with an ad ID 224 for one or more advertisements 226. The ad store 220 may also include a collection of ad slates 228 that may be generated using dynamic programming to recursively evaluate the utility of candidate slates of advertisements in order to generate a maximum utility slate of advertisements, each ad slate representing an ordered candidate set of advertisements for keywords of a query request.

There are many applications which may use the present invention for generating a maximum utility slate of advertisements for online advertisement auctions. For example, online search advertising applications may use the present invention to generate a maximum utility slate of advertisements to be displayed with query results as a set of sponsored links for a given query in an auction environment where there may be bids by advertisers, expected click through rates (CTRs), and some utility value associated with placing a particular ad in a particular position in an ordered list of advertisements. An online search advertising application for a second-price auction may similarly use the present invention to generate a maximum utility slate of advertisements to be displayed with query results. Or online content match advertising applications may use the present invention in response to a request for advertisements to generate a maximum utility slate of advertisements to be placed on a web-page for display. For any of these online advertisement auction applications, a maximum utility slate of advertisements may be generated that optimizes the utility objective of the auctioneer, including maximizing expected revenue, reducing ad fatigue induced by overexposure of the ad, scheduling bidders' bids within budget constraints, and so forth.

Figure 3:
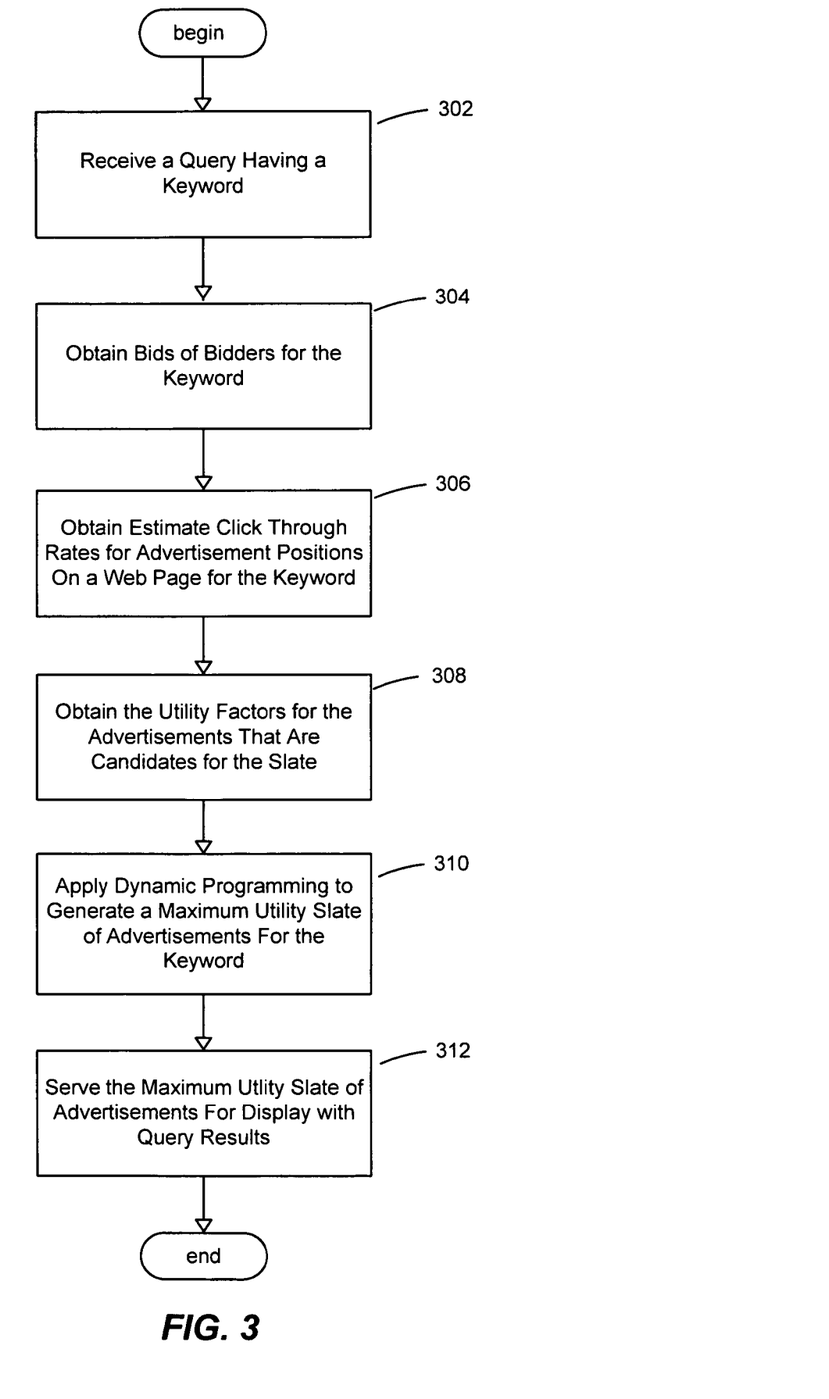
FIG. 3 is a flowchart for generally representing the steps undertaken in one embodiment for generating a maximum utility slate of advertisements for online advertisement auctions, in accordance with an aspect of the present invention.

FIG. 3 presents a flowchart for generally representing the steps undertaken in one embodiment for generating a maximum utility slate of advertisements for online advertisement auctions. At step 302, a query having a keyword may be received. For example, a query may be received from a web browser by an online advertising application operating on a server that may generate a maximum utility slate of advertisements to be displayed with query results as a set of sponsored links for the given query in an auction environment where there may be bids by advertisers, expected click through rates (CTRs), and some utility value associated with placing a particular ad in a particular position in an ordered list of advertisements. In another embodiment, the query may represent a request from a web page server received by an online content match advertising application operating on a server that may generate a maximum utility slate of advertisements to be placed on a web-page for display.

At step 304, bids of bidders may be obtained for the keyword. In an embodiment, consider $j=1, \ldots, n$ to denote n bidders and, furthermore, consider these numerically ordered indices to also indicate the bid ranking, initially assumed to be determined solely by the bids. Accordingly, if the bid of bidder j may be denoted by $A_j$, then $A_1 \geq A_2 \ldots \geq A_n$. A slate of ads may then be denoted by the subset $S=\{J_1, \ldots, j_m\}$ where $j_1, \ldots, j_m$ is a set of increasing indices denoting the bidders chosen by the slate for the m ad positions $p=1, \ldots, m$. At step 306, the estimated click-through-rate may be determined for ad positions on a web page for the keyword. In an embodiment, consider $T_{jp}$ to denote the click-through rate (CTR) for the ad of bidder j when the ad may be placed at position p.

At step 308, a utility factor may be obtained for each advertisement that may be a candidate for a slate of advertisements. For instance, consider $\rho_j$ to represent a utility factor associated with the appearance of bidder j in a slate of ads. Those skilled in the art will appreciate that a utility factor may be chosen for different objectives of an auctioneer including for maximizing expected revenue, reducing ad fatigue induced by overexposure of the ad, and scheduling bids for ads within bidders' budget constraints, and so forth. For example, each utility factor may be set to unity, assuming the CTRs are independent, for generating a utility slate maximizing expected revenue in an embodiment. Or, each CTR may be represented in another embodiment as a product of two components: one component may be dependent upon the ad, independent of position, and another component may be dependent upon position of the ad. In this case, $T_{jp}$ may be reduced to represent a position only component $T_p$ and an ad-dependent component which may become a contributor to $\rho_j$.

Once a utility factor may be obtained for each advertisement that may be a candidate for a slate of advertisements, dynamic programming may be applied to generate a maximum utility slate of advertisements for the keyword at step 310. In an embodiment, a second-price auction by bid value may be assumed, so that bidder $j_p$ in position p pays the bid $A_{j_{p+1}}$ of the bidder occupying position p+1. In addition, there may be a minimum bid $\epsilon$, which may be paid by the last bidder in the slate if there may not be lower bidders on the query. Under these assumptions, the maximum utility slate may be determined by solving the following equation:

$$\max_S U = \sum_{p=1}^{m} \rho_{j_p} T_{j_p p} A_{j_{p+1}}.$$

At step 312, the maximum utility slate may be served for display with query results. For instance, the maximum utility slate of advertisements may be sent to a web browser in an embodiment for display as an ordered set of sponsored links.

Figure 4:
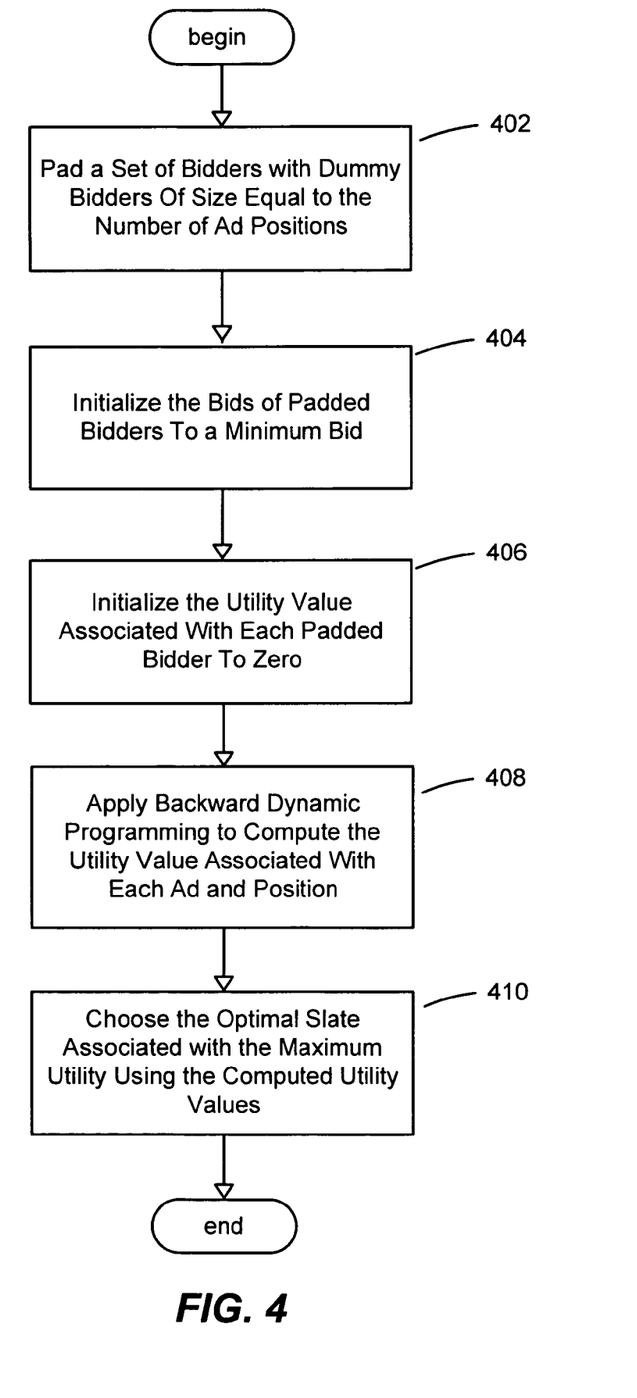
FIG. 4 is a flowchart for generally representing the steps undertaken in one embodiment for applying backward dynamic programming to recursively evaluate the utility of subslates of advertisements in order to generate a maximum utility slate of advertisements for online advertising auctions, in accordance with an aspect of the present invention.

FIG. 4 presents a flowchart for generally representing the steps undertaken in one embodiment for applying backward dynamic programming to recursively evaluate the utility of subslates of advertisements in order to generate a maximum utility slate of advertisements for online advertising auctions. In an embodiment, a $O(n^2 m)$ algorithm may be provided for solving the optimization problem, $$\max_S U = \sum_{p=1}^{m} \rho_{j_p} T_{j_p p} A_{j_{p+1}}$$

using a dynamic programming algorithm with backward recursion. For a general discussion of dynamic programming with backward recursion, see, for instance, R. E. Bellman and S. Dreyfus, *Applied Dynamic Programming*, Princeton University Press, Princeton, N.J. (1962).

In this embodiment, dynamic programming may be applied using backward recursion for slates of size m, representing the maximum number of ad positions. To facilitate dynamic programming, a set of m dummy bidders may be padded to the set of bidders at step 402. The set of dummy bidders may be defined as $\{n+1, \ldots, n+m\}$. More formally, slates smaller than size m may thus be padded with a set of dummy bidders at the end to produce a slate of exactly size m. The bids of the set of dummy bidders may be initialized in an embodiment at step 404 to a minimum bid amount so that $A_j = \epsilon$ for $j=n+1, \ldots, n+m$. And the utility value of each padded bidder may be initialized to zero at step 406 so that $\rho_j = 0$ for $j=n+1, \ldots, n+m$ in an embodiment.

At step 408, backward dynamic programming may be applied to compute the utility value associated with each advertisement and advertisement position. For example, one j and one s may be chosen such that $1 \leq s \leq m$ and a subslate starting from j at position s may then be defined as a set of increasing indices, $\tilde{S} = \{j_s, j_{s+1}, \ldots, j_m\}$ such that $j_s = j$. Considering $\tilde{S}(s, j)$ to denote the set of all such subslates, a utility revenue may be computed for each subslate in the set of subslates for a maximal utility revenue by solving the optimization problem:

$$F(j, s) = \max_{\tilde{S} \in \tilde{S}(s,j)} \sum_{p=s}^{m} \rho_{j_p} T_{j_p p} A_{j_{p+1}}.$$

Assuming $F(j_{s+1}, s+1)$ may be known for all $j_{s+1} > j$, then $$F(j, s) = \max_{\tilde{S} \in \tilde{S}(s,j)} \sum_{p=s}^{m} \rho_{j_p} T_{j_p p} A_{j_{p+1}}$$

may be computed using standard dynamic programming as $$F(j, s) = \max_{j_{s+1} > j} \rho_j T_{js} A_{j_{s+1}} + F(j_{s+1}, s+1).$$

To do so, the dynamic programming algorithm may initially set $F(j,s)=0 \forall j=n+1, \ldots, n+m; s=1, \ldots, m$ and may then recurse backwards and compute $F(j,s)=0 \forall s=1, \ldots, m; j=1, \ldots, n$.

Finally, the optimal slate of advertisements with the maximum utility may be chosen using the computed utility values at step 410 by choosing $\max_j F(j,1)$ to obtain the solution of $$\max_S U = \sum_{p=1}^{m} \rho_{j_p} T_{j_p p} A_{j_{p+1}}$$

as well as the optimal slate. Those skilled in the art will recognize this to be a well-known dynamic programming computation. After choosing the optimal slate of advertisements with the maximum utility, processing may be finished for applying backward dynamic programming to recursively evaluate the utility of subslates of advertisements in order to generate a maximum utility slate of advertisements for online advertising auctions.

Figure 5:
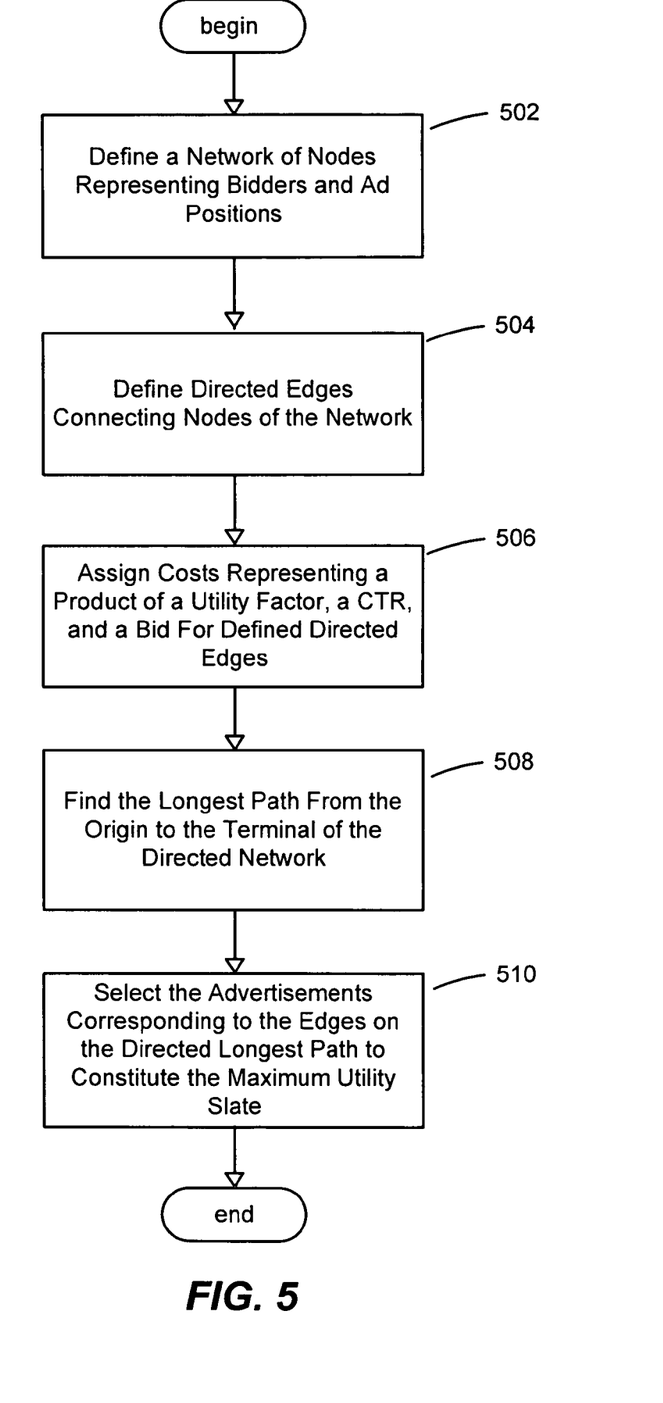
FIG. 5 is a flowchart for generally representing the steps undertaken in one embodiment for applying forward dynamic programming to recursively evaluate the utility of subslates of advertisements in order to generate a maximum utility slate of advertisements for online advertising auctions, in accordance with an aspect of the present invention.
Figure 6:
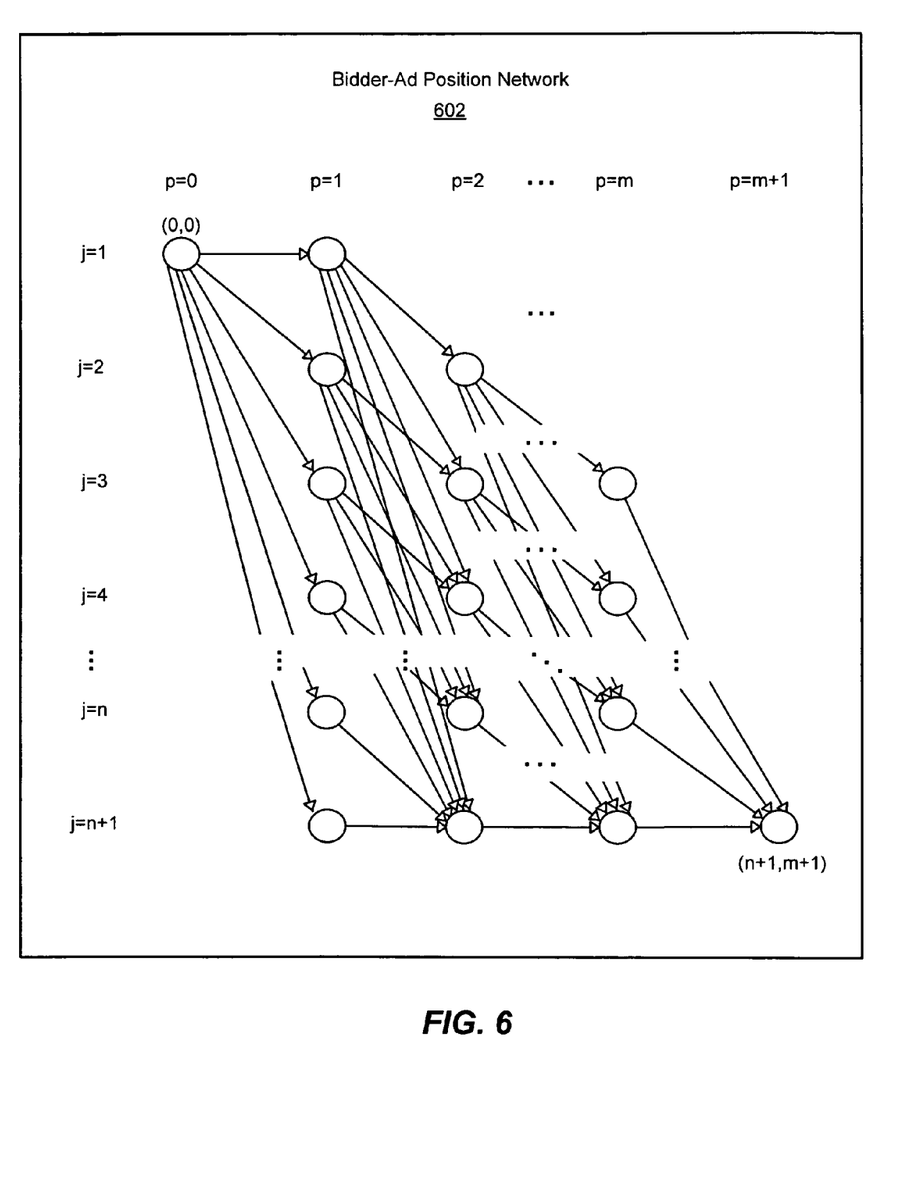
FIG. 6 is an illustration depicting in an embodiment a directed network of nodes representing bidders and ad positions, in accordance with an aspect of the present invention.

A solution of the optimization problem $$\max_S U = \sum_{p=1}^{m} \rho_{j_p} T_{j_p p} A_{j_{p+1}}$$

may also be computed using forward dynamic programming. FIG. 5 presents a flowchart for generally representing the steps undertaken in one embodiment for applying forward dynamic programming to recursively evaluate the utility of subslates of advertisements in order to generate a maximum utility slate of advertisements for online advertising auctions. In an embodiment, a network with directed edges and associated costs may be defined, and the longest path may be found from a node of origin to a terminal node of the directed network for constructing a maximum utility slate of advertisements. At step 502 a network of nodes representing bidders and ad positions may be defined. For instance, FIG. 6 presents an illustration of a directed network representing bidders and ad positions. More particularly, the directed network 602 of FIG. 6 illustrates n bidders and m ad positions. Such a network may be defined with nodes $N_{j,p}$ for $p=1, \ldots, m$ and $j=p, \ldots, n+1$. A node of origin, $N_{0,0}$, and a terminal node, $N_{n+1,m+1}$, may also be defined.

Figure 7:
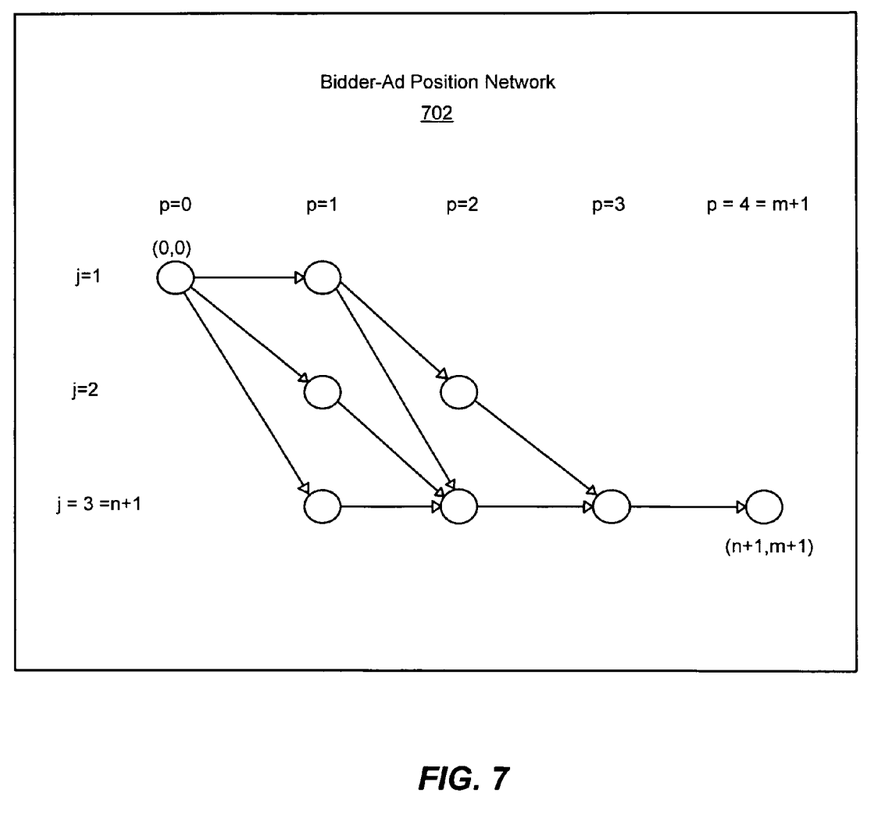
FIG. 7 is an illustration depicting in an embodiment a directed network representing bidders and ad positions where the number of ad positions exceeds the number of bidders, in accordance with an aspect of the present invention.

At step 504, directed edges connecting nodes of the network may be defined, and costs representing a product of a utility factor, a CTR value and a bid amount may be assigned at step 506 for defined directed edges. For example, the directed edges of the network and their associated costs may be defined as follows:

$(N_{0,0}, N_{j,1}): c_{0,j,0}=0\ j=1, \ldots, n+1$ $(N_{i,p}, N_{j,p+1}): c_{i,j,p}=\rho_i A_j T_{ip}\ j>i \geq p=1, \ldots, m-1$ $(N_{j,m}, N_{n+1,m+1}): c_{j,n+1,m}=\rho_i A_j T_{jp}\ j=p, \ldots, n-1$ $(N_{n,m}, N_{n+1,m+1}): c_{n,n+1,m}=\rho_n \epsilon T_{nm}$ $(N_{n+1,p}, N_{n+1,p+1}): c_{n+1,n+1,p}=0\ p=1, \ldots, m,$ where $c_{i,j,p}$ may represent the cost for the edge directed from $N_{i,p}$ to $N_{j,p+1}$ and $\epsilon$ may represent the minimum bid. Note that not all of these edges may need to be defined, as may be the case where n<m. For example, FIG. 7 presents an illustration of a directed network representing bidders and ad positions where the number of ad positions exceeds the number of bidders. In this case, a directed edge may not need to be defined from $N_{n,m}$ to $N_{n+1,m+1}$.

After defining a directed network of nodes with costs assigned to directed edges, the longest path may be found at step 508 from an origin node of the directed network to a terminal node of the directed network. The edges along the longest path from $N_{0,0}$ to $N_{n+1,m+1}$ may provide a solution for $$\max_S U = \sum_{p=1}^{m} \rho_{j_p} T_{j_p p} A_{j_{p+1}}.$$

In an alternate embodiment, the shortest path from $N_{0,0}$ to $N_{n+1,m+1}$ may also maximize $$\max_S U = \sum_{p=1}^{m} \rho_{j_p} T_{j_p p} A_{j_{p+1}}$$

using the negatives of the costs defined above. Those skilled in the art will appreciate that very efficient algorithms known for the shortest path problem may also be applied in various implementations of the present invention. At step 510, advertisements corresponding to the edges on the directed longest path may be selected to construct the maximum utility slate and processing may be finished for applying forward dynamic programming to recursively evaluate the utility of subslates of advertisements in order to generate a maximum utility slate of advertisements for online advertising auctions.

The present invention may be extended to what may be referred to as revenue ordering, where the ads may be ranked not just by bid, but by expected revenue which may better represent the value of a bidded ad than the raw bid. This may be modeled as the product of the advertiser's bid $A_j$ and a quality score $Q_j$, or "clickability", for bidder j's ad. The ads may be ranked according to this product, so that: $A_1 Q_1 \geq A_2 Q_2 \ldots \geq A_n Q_n$.

To preserve the condition that the expected payment for a click may be at least that of the next ranked bidder, the expected cost per click (CPC) of bidder $j_p$ may be required to be at least $$\frac{A_{j_{p+1}} Q_{j_{p+1}}}{Q_{j_p}}.$$

Applying this requirement, the path technique may be extended for expected revenue ordering by using the following objective function:

$$\text{Maximize } \tilde{U} = \sum_{p=1}^{m} \rho_{j_p} A_{j_{p+1}} \frac{Q_{j_{p+1}}}{Q_{j_p}} T_{j_p p},$$

where the network model above may remain the same except that the edge costs may now be modified to be:

$(N_{0,0}, N_{j,1}): c_{0,j,0}=0\ j=1, \ldots, n+1$ $(N_{i,p}, N_{j,p+1}): c_{i,j,p}=\rho_i A_j Q_j / Q_i T_{ip}\ j>i \geq p=1, \ldots, m-1$ $(N_{j,m}, N_{n+1,m+1}): c_{j,n+1,m} = \rho_i A_{j+1} Q_{j+1}/Q_j T_{jp} \, j=p, \ldots, n-1$ $(N_{n,m}, N_{n+1,m+1}): c_{n,n+1,m} = \rho_n \epsilon T_{nm}$ $(N_{n+1,p}, N_{n+1,p+1}): c_{n+1,n+1,p} = 0 \, p=1, \ldots, m.$ Advantageously, the path technique may also be extended in various embodiments to other practically useful variants. For example, one such embodiment may include introducing restrictions on a subset of ads that may be omitted from the slate. Another such embodiment may include using a hybrid objective function which may be made up of a weighted sum of the first and second price utilities. In various embodiments introducing restrictions on a subset of ads that may be omitted from the slate, restrictions may be applied for excluding budgeted bidders and/or unbudgeted bidders from the slate. To do so, a mask or bit vector associated with a slate of ads may specify bidders which may be allowed to be excluded from a slate by setting the value of the ad position in the bit vector to 1 if the ad can be excluded and a zero otherwise. Since each arc in the network may give the utility of including a particular ad i in position p followed by ad j, the path technique may then be modified to consider only arcs such that:

1. For each position p, the values from p up to the first ad in rank order which has a zero mask bit may be assumed by i. Any subsequent ads may be ignored for this position p. This may ensure that the unmasked ad with the highest rank may not be excluded, but that lower ranked ads which are masked may not be considered for the position p;
2. For each i chosen as above, the second index j may run from i+1 through the next unmasked ad. This may ensure that if an ad i can be followed by an unmasked ad, it will be the next in rank order.

These modifications may be implemented by modifying the longest path algorithm accordingly for excluding a subset of ads from a slate.

The path technique may also be extended in various other embodiments using a hybrid objective function which may be made up of a weighted sum of the first and second price utilities. Many factors may be considered in a utility calculation, including second price utilities and first price utilities. For example, first prices may be considered on the assumption that these prices may be the actual values placed by the bidders on a click for their ad. Alternatively, there may also be interested in the raw number of expected clicks. Both of these situations can be accommodated by considering a composite weighted objective function which may take into account both first and second prices in specifying the arc costs in the longest path algorithm. Consider the following composite function to represent the weighted sum of first and second price utilities:

$$\text{Maximize } \hat{U} = \sum_{p=1}^{m} \mu_{j_p} A_{j_p} T_{j_p p} + \sum_{p=1}^{m} \rho_{j_p} A_{j_{p+1}} \frac{Q_{j_{p+1}}}{Q_{j_p}} T_{j_p p}.$$

This objective function may be re-written as:

$$\text{Maximize } \hat{U} = \sum_{p=1}^{m} \left( \mu_{j_p} A_{j_p} + \rho_{j_p} A_{j_{p+1}} \frac{Q_{j_{p+1}}}{Q_{j_p}} \right) T_{j_p p}.$$

The longest path algorithm may be solved as before if the relevant arc costs may be defined as:

$$c_{i,j,p} = \left( \mu_j A_j + \rho_i A_j \frac{Q_j}{Q_i} \right) T_{ip} \quad j > i \geq p = 1, \ldots, m-1$$

$$c_{j,n+1,m} = \left( \mu_j A_j + \rho_j A_{j+1} \frac{Q_{j+1}}{Q_j} \right) \quad j = p, \ldots, n-1.$$

As may now be appreciated, this framework may be very flexible and may support many extensions. For example, there may be a weighted combination of expected revenue and expected clicks by setting $\mu_j$ to $1/A_j$. Moreover, the algorithms described may be efficient in terms of number of operations, especially since the numbers involved may be relatively small in the on-line advertising framework. Typically the number of ad positions m may be less than 12, and the number of bidders n which need to be considered for inclusion in a slate may be a few dozen. Thus, these algorithms may be executed repetitively, in real or near-real time as necessary.

As can be seen from the foregoing detailed description, the present invention provides an improved system and method for generating a maximum utility slate of advertisements for online advertisement auctions. Such a system and method may efficiently generated slates of advertisements by using dynamic programming to recursively evaluate the utility of candidate slates of advertisements in order to generate a maximum utility slate of advertisements. The system and method may apply broadly to online advertisement auction applications and may be used by many different applications including online search advertising applications to generate a maximum utility slate of advertisements to be displayed with query results as a set of sponsored links for a given query, online search advertising applications for a second-price auction, and online content match advertising applications for placement of advertisements on web-pages for display. For any of these online advertisement auction applications, a maximum utility slate of advertisements may be generated that optimizes the utility objective of the auctioneer, including maximizing expected revenue, reducing ad fatigue, scheduling bids within budget constraints, and so forth. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for providing online advertisements, comprising:
    a server comprising a processor device, an input/output interface, and memory, said server configured to perform:
    receiving a query comprising a keyword;
    obtaining from a data store:
        bids from bidders in an online advertising auction, said bids for displaying advertisements, wherein said bidders are associated with the keyword;
        click-through rates for advertisement positions on a web page; and utility factors associated with the advertisement positions in a slate of advertisements;
using dynamic programming to recursively evaluate a utility of subslates of the advertisements in order to generate a maximum utility slate of the advertisements for the keyword, using a plurality of the bids, a plurality of the click-through rates, and a plurality of the utility factors;
wherein the maximum utility slate of the advertisements comprises a maximum number m of advertisement positions;
placing the advertisements from the bidders in the advertisement positions within the slate of advertisements;
padding any empty positions at an end of the slate of advertisements with dummy bidders to produce the maximum utility slate with exactly the maximum number m of the advertisement positions;
initializing the bids of the dummy bidders to a minimum bid amount;
initializing the utility factor of each dummy bidder to zero; and
outputting the maximum utility slate of advertisements; and
an advertisement store storing the slate of advertisements for the online advertising auction.

2. The system of claim 1 wherein the dynamic programming analysis engine further comprises an operably coupled backward analysis engine for performing dynamic programming using a backward recursive evaluation of the utility of subslates of advertisements.

3. The system of claim 1 wherein the dynamic programming analysis engine further comprises an operably coupled forward analysis engine for performing dynamic programming using a forward recursive evaluation of the utility of subslates of advertisements.

4. A computer-implemented method for providing online advertisements, comprising:
using an input/output interface receiving a query comprising a keyword;
obtaining from a data store:
bids of bidders in an online advertising auction, said bids for displaying advertisements, wherein said bidders are associated with the keyword;
click-through rates for advertisement positions on a web page; and
utility factors, each utility factor associated with a position of an advertisement in a slate of advertisements, wherein the slate of advertisements comprises an ordered list of advertisements;
generating, by a processor device, a maximum utility slate of the advertisements for the keyword, using a plurality of the bids, a plurality of click-through rates, and a plurality of the utility factors;
wherein the maximum utility slate of the advertisements comprises a maximum number m of advertisement positions;
placing the advertisements from the bidders in the advertisement positions within the slate of advertisements;
padding any empty positions at an end of the slate of advertisements with dummy bidders to produce the maximum utility slate with exactly the maximum number m of the advertisement positions;
initializing the bids of the dummy bidders to a minimum bid amount;
initializing the utility factor of each dummy bidder to zero;
determining the maximum utility slate of advertisements by applying dynamic programming to recursively evaluate the utility of subslates of advertisements in order to generate a maximum utility slate of advertisements; and
outputting the maximum utility slate of advertisements for the online advertising auction.

5. The method of claim 4 wherein applying dynamic programming to recursively evaluate the utility of subslates of advertisements in order to generate the maximum utility slate of advertisements comprises:
applying backward dynamic programming to recursively evaluate the utility of a set of subslates of advertisements; and
selecting a sub slate of advertisements with the maximum utility from the set of subslates of advertisements.

6. The method of claim 4 wherein applying dynamic programming to recursively evaluate the utility of subslates of advertisements in order to generate a the maximum utility slate of advertisements comprises applying forward dynamic programming to find a longest path from a node of origin to a terminal node within a directed network of nodes representing bidder and ad positions.

7. The method of claim 6 wherein applying forward dynamic programming to find a longest path from a node of origin to a terminal node within a directed network of nodes representing bidder and ad positions comprises steps of:
determining the directed network of nodes representing bidder and ad positions;
defining directed edges connecting the nodes of the directed network; and
assigning costs for defined directed edges, each cost representing a product of a utility factor, a click-through rate and a bid of a bidder.

8. The method of claim 7 wherein a utility factor comprises a weighted sum of a value of a first price utility and a value of a second price utility.

9. The method of claim 4 wherein each utility factor comprises a value representing ad fatigue.

10. The method of claim 4 wherein each utility factor comprises a value representing expected revenue.

11. The method of claim 4 wherein each utility factor comprises a value representing usage of a bidder's budget.

12. The method of claim 4 wherein determining the maximum utility slate of advertisements comprises using a plurality of quality scores.

13. The method of claim 12 further comprising obtaining the plurality of the quality scores for advertisements, each quality score representing a ratio of a first bid term and a second bid term.

14. A non-transitory computer-readable medium having computer-executable instructions for performing steps of:
receiving a query comprising a keyword;
obtaining from a data store:
bids from bidders in an online advertising auction, said bids for displaying advertisements, wherein said bidders are associated with the keyword;
click-through rates for advertisement positions on a web page; and
utility factors associated with the advertisement positions in a slate of advertisements;
using dynamic programming to recursively evaluate a utility of subslates of the advertisements in order to generate a maximum utility slate of the advertisements for the keyword, using a plurality of the bids, a plurality of the click-through rates, and a plurality of the utility factors;
wherein the maximum utility slate of the advertisements comprises a maximum number m of advertisement positions;

placing the advertisements from the bidders in the advertisement positions within the slate of advertisements;

padding any empty positions at an end of the slate of advertisements with dummy bidders to produce the maximum utility slate with exactly the maximum number m of the advertisement positions;

initializing the bids of the dummy bidders to a minimum bid amount;

initializing the utility factor of each dummy bidder to zero; and outputting the maximum utility slate of advertisements; and an advertisement store storing the slate of advertisements for the online advertising auction.

\* \* \* \* \*